HAROLD E. ROSENBERGER
INVENTOR.

BY Frank C. Parker
ATTORNEY

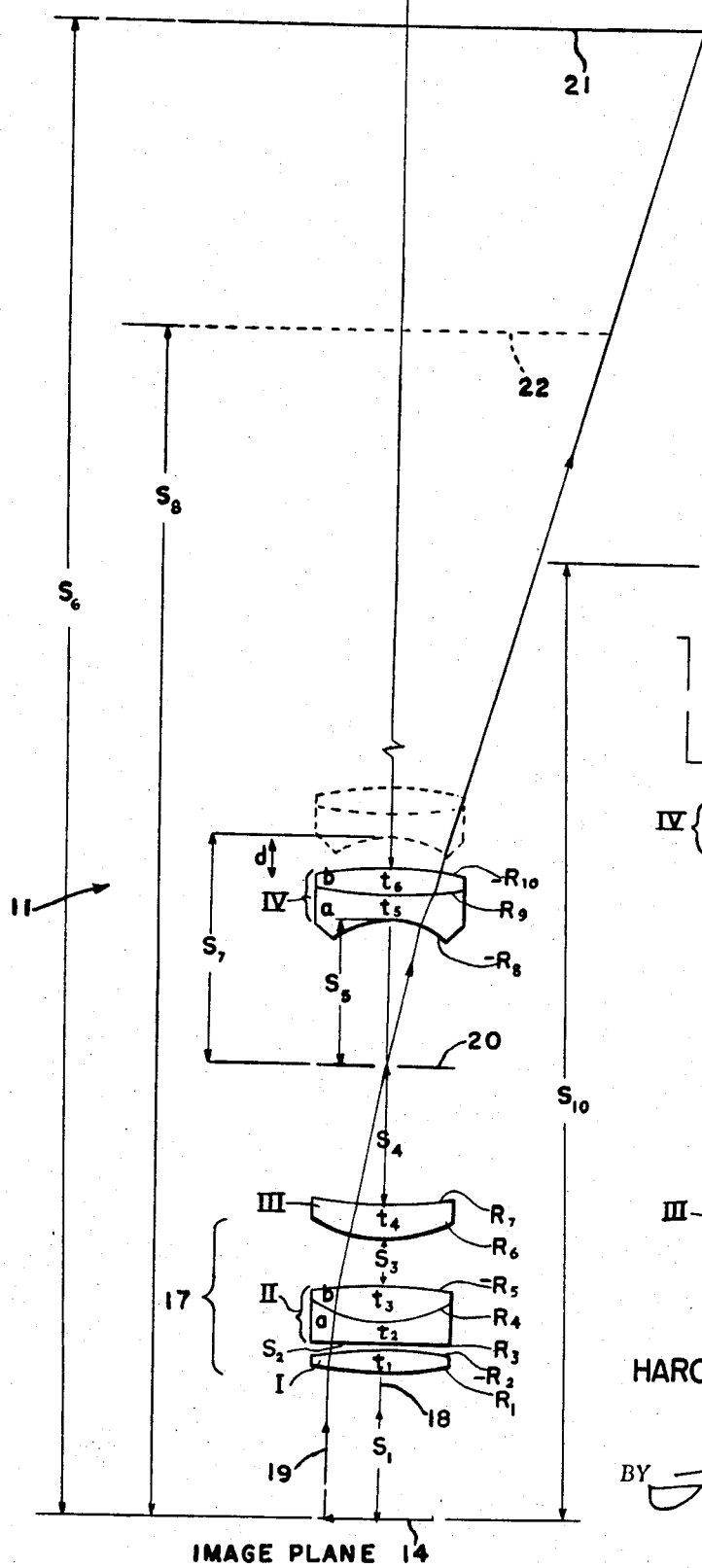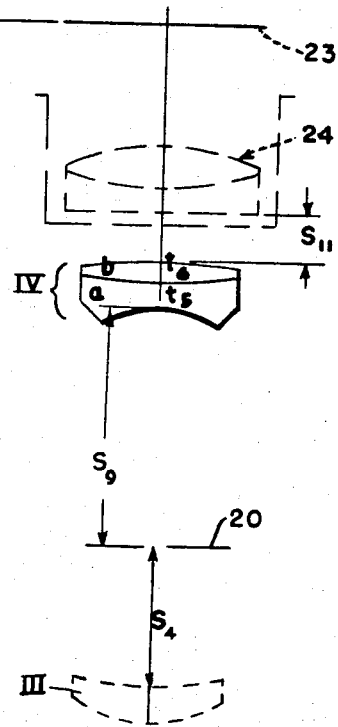
HAROLD E. ROSENBERGER
INVENTOR.

United States Patent Office 3,561,843
Patented Feb. 9, 1971

---

3,561,843
MULTIFOCAL PROJECTION LENS SYSTEM
Harold E. Rosenberger, Brighton, N.Y., assignor to Bausch & Lomb Incorporated, Rochester, N.Y., a corporation of New York
Filed Aug. 27, 1969, Ser. No. 853,426
Int. Cl. G02b 9/34, 21/02
U.S. Cl. 350—183                    4 Claims

ABSTRACT OF THE DISCLOSURE

A projection lens system composed of a fixed positive power front lens group and a focusable negative power rear lens group, said system being operative within a numerical magnification range of at least 3⅓ and producing a flat field, the image formed by said system being particularly characterized by low distortion as well as being well corrected for the usual chromatic and monochromatic image aberrations.

BACKGROUND OF THE INVENTION

Particularly in the field of photomicrography there is a need for an auxiliary projection lens system which may be used with a compound microscope so that the combined optical assembly provides easy adaptability to the use of various camera adapter sizes such as for instance the 35 mm. camera, 3¼" x 4¼", or 4" x 5" cameras.

As far as optical characteristics of projection lenses used for the above stated purpose is concerned, it is the usual practice to employ a conventional positive focal length visual eyepiece which is refocused to work between finite conjugates. Alternatively it is customary to employ a negative focal length amplifier lens in much the same way.

Such a positive length lens has the disadvantages of (1) adding undercorrected field curvature to the microscope image forming optical system, and (2) adding image distortion of the order of 7% or more. It is also true that said negative focal length lens adds overcorrected field curvature to the optical system which is advantageous when used with classical microscope objectives in the prior art, but which is a disadvantage when used with modern flat field microscope objectives such as shown in patent application Ser. No. 732,485 of Harold E. Rosenberger originally field Nov. 4, 1964. Negative lenses contribute image distortion of the same order of magnitude as the aforesaid positive lenses.

A further disadvantage residing in negative focal length projection or relay lenses is the absence of a real image of the microscope objective exit pupil wherein a photographic shutter can be located. If the shutter is located in other than the pupil image position, a variation in exposure of the film from center to edge becomes apparent at shutter speeds faster than about 1/100 of a second. Furthermore, the free aperture of the shutter must be nearly ten times as large as would be required if a real pupil image were available and such a size results in real difficulty when automatic exposure control is desired.

SUMMARY OF THE INVENTION

The present invention relates to projection or relay lenses for such apparatus as photomicrographs or the like and more particularly relates to constructions thereof whereby a stationary image may be projected at selected magnifications upon image receiving surfaces of different sizes.

In view of the foregoing statements, it is an object of the present invention to provide a projection or relay lens which is used as an auxiliary to a microscope or the like for projecting an image at any one of several selected magnifications onto a camera film surface.

It is a further object of the present invention to provide such a device which is relatively economical to manufacture and reduces the operation of photomicrographic projectors to a near minimum, resulting in a great saving of set-up time.

It is a still further object of the invention to provide such a device which is distinguished by substantially zero Petzval sum, and very low image distortion, the chromatic and monochromatic aberrations thereof being extraordinarily well corrected.

A further object of the present invention is to provide such a device which produces an available real image of the exit pupil of the microscope objective wherein a shutter and control mechanism therefor may advantageously be located.

Further objects and advantages reside in the combination and details of construction of the elements of the lens system as described in the specification herebelow taken in connection with the accompanying drawing.

BRIEF DESCRIPTION OF THE DRAWINGS

In the drawings, FIG. 2 is an optical diagram illustrating a preferred form of lens system constructed according to the present invention and showing two operative positions therefor, and FIG. 3 is a fragmentary optical diagram similar to FIG. 2 showing certain parts in another operative position.

DESCRIPTION OF PREFERRED FORM OF INVENTION

Figure 1:
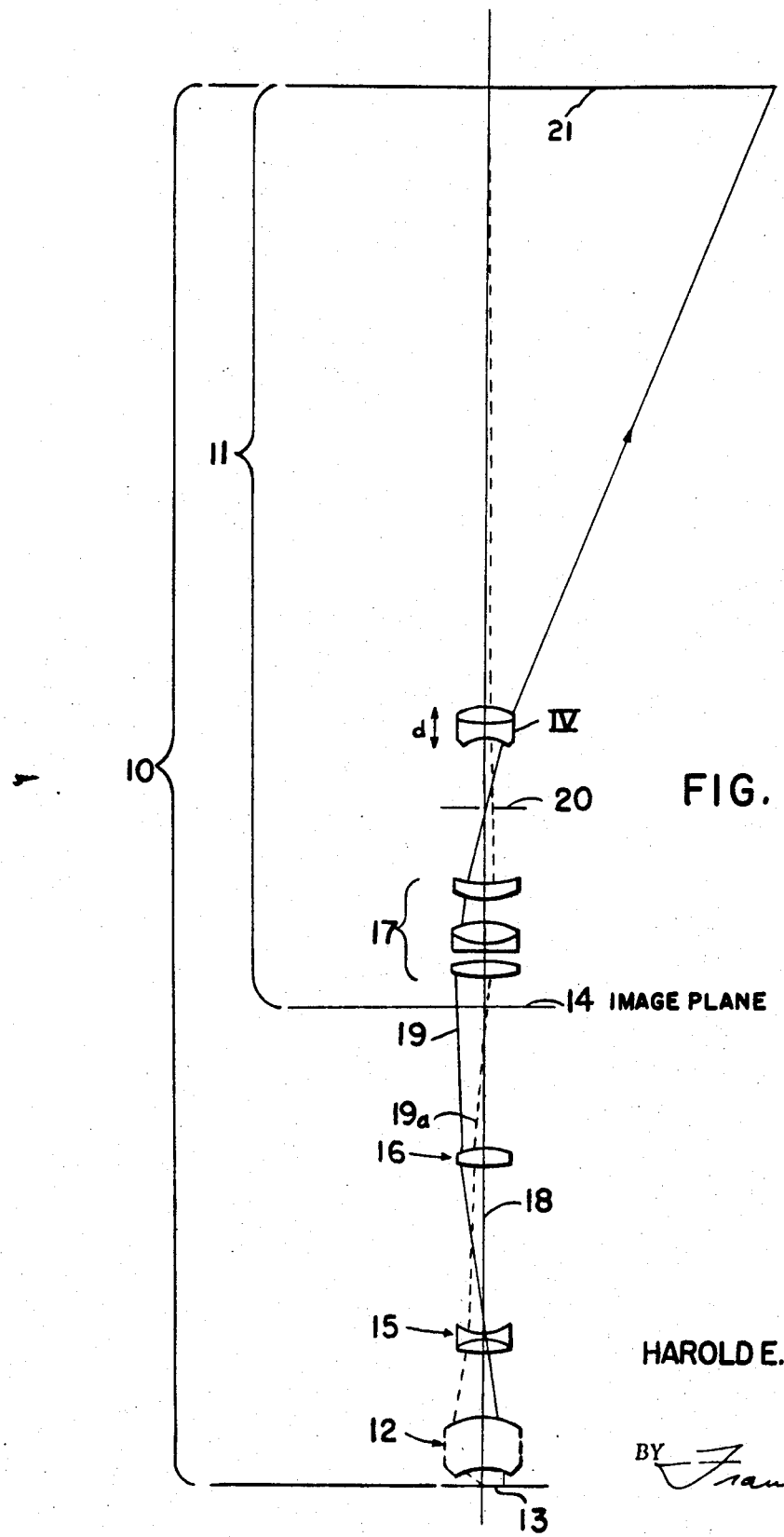
FIG. 1 is an optical diagram showing a microscope optical system embodying the present invention.

In the drawings, FIG. 1 illustrates a microscope lens system designated by numeral 10 wherein a novel projection lens system 11 constructed according to the present invention is incorporated. Represented in the microscope lens system 10 is an objective 12 which is focused upon a specimen plane 13. An image of said specimen is formed at an image plane 14 by the successive action of the objective 12, a collimating relay lens 15, and a focusing telescope lens 16.

In FIG. 2 of the drawing, the projection optical system is designated per se by numeral 11 and it is characterized by a front positive group of lens members designated, collectively by numeral 17, which are aligned on an optical axis 18 with a rear negative lens group designated IV which is axially movable as indicated by the double ended arrow $d$ to vary the focal length of the system.

The front lens group 17 receives image rays, such as the principal field ray 19 and the axial ray 19$a$ in FIG. 1 after traversing the image plane 14 heretofore mentioned.

The front lens group 17 includes a front lens member I which is double convex in form, the front surface being designated $R_1$ and the rear surface being designated $-R_2$, the minus (—) sign denoting that the center of curvature of such a surface lies on the object side of said surface. Lens member I has an axial thickness designated $t_1$ and is spaced at an axial distance $S_1$ rearwardly of said image plane 14.

Spaced at an axial distance designated $S_2$ rearwardly of member I is a doublet lens member designated II which is composed of a front plane concave lens element II$a$ which lies in contact with a rear double convex lens member designated IIb. The most rearward member of the positive lens group 17 is a meniscus singlet lens member designated III which is concave toward the rear.

Element IIa has a plano front surface denoted $R_3$ and a concave rear surface denoted $R_4$, these surfaces being spaced from each other by an axial distance designated $t_2$. Element IIb contacts element IIa along the interface surface $R_4$ which is spaced axially at a distance $t_3$ from its rear convex surface $-R_5$.

The most rearward lens member III of the positive lens group 11 is meniscus in form and has positive power, the front and rear surfaces thereof being designated respectively $R_6$ and $R_7$ and being spaced from each other by an axial distance $t_4$. Airspace $S_3$ separates lens members II and III.

At the most favorable location in the lens system 11, a pupil 20 is formed whereat a suitable shutter not shown is advantageously provided, particularly when automatic electronic shutters are used. Said pupil 20 is located at an axial distance designated $S_4$ rearwardly of lens member III.

The aforementioned negative focusable lens group IV consists of a doublet lens member having meniscus form and being composed of a front double concave lens element IVa and a double convex lens element IVb lying in contact with its rear surface. Successively from the front, the lens surfaces are designated $-R_8$, $R_9$ and $-R_{10}$, the radius $R_9$ designating an interface between the lens elements IVa and IVb. Symbols $t_5$ and $t_6$ designate the axial thicknesses respectively of elements IVa and IVb.

For the accommodation of different sizes of photomicrographic cameras, not shown, the magnification of the image surface produced by projection lens 11 must be changed by moving the negative doublet IV axially as indicated by the double ended arrow d. For instance in FIG. 2 image surface 21 involves a magnification of 10×, and image surface 22 involves a magnification of 7.5×, the axial distances of the doublet IV from the pupil 20 being respectively $S_5$ and $S_7$ and the corresponding back focal distances from image plane 14 being $S_6$ and $S_8$.

With reference to FIG. 3, the image surface 23 is produced with a magnification of 3× and the corresponding axial distance between the pupil 20 and lens member IV is designated $S_9$ and the back focal distance thereof from the image plane 14 is designated $S_{10}$. The axial distances $S_9$ and $S_{10}$ are computed with regard to the particular case where as camera lens 24 of 0.4× magnification forms an inseparable part of the recording camera structure and must be taken into account in computing said axial distances. The constant axial distance between the camera lens 24 and lens member IV is designated $S_{11}$.

By experimentation and computation, suitable values are established for the above-mentioned lens parameters and for the refractive index and Abbe number which are designated $n_D$ and $\nu$ respectively of the glass or optical materials from which the lenses are made, the values being given in terms of the equivalent focal length F of the aforesaid front positive lens group 17 in Table I herebelow.

TABLE I $2.15F < R_1 < 2.19F$
$2.15F < -R_2 < 2.19F$
$R_3 > \pm 10.0F$
$.62F < R_4 < .64F$
$2.70 < -R_5 < 2.76F$
$.72F < R_6 < .74F$
$1.82F < R_7 < 1.86F$
$.42F < -R_8 < .43F$
$2.29F < R_9 < 2.34F$
$1.57F < -R_{10} < 1.60F$
$.107 < t_1 < .119F$
$.107F < t_2 < .119F$
$.163F < t_3 < .176F$

TABLE I—Continued $.136F < t_4 < .148F$
$.127 < t_5 < .139F$
$.136F < t_6 < .148F$
$1.10F < S_1 < 1.32F$
$.005F < S_2 < .017F$
$.236F < S_3 < .248F$
$.709F < S_4 < .737F$
$.672F < S_5 < .764F$ [1]
$9.5F < S_6 < 10.5F$ [1]
$.792 < S_7 < .884F$ [2]
$7.5 < S_8 < 8.5$ [2]
$1.586 < n_D(I) < 1.590$
$1.671 < n_D(IIa) < 1.675$
$1.586 < n_D(IIb) < 1.590$
$1.586 < n_D(III) < 1.590$
$1.515 < n_D(IVa) < 1.519$
$1.717 < n_D(IVb) < 1.723$
$59.0 < \nu(I) < 63.0$
$30.0 < \nu(IIa) < 33.5$
$59.0 < \nu(IIb) < 63.0$
$59.0 < \nu(III) < 63.0$
$62.5 < \nu(IVa) < 66.5$
$40.0 < \nu(IVb) < 44.0$

[1] At 10× magnification.
[2] At 7.5× magnification.

With regard to the ranges of values stated in Table I, these values are so stated and claimed for their respective optical parameters for the purpose of including all lenses which are produced by the prevailing manufacturing processes. It is well known in the art that it is practically impossible to manufacture a production run of lens elements economically while hold the parameters to ideal values. Therefore, all lenses are specified with tolerances within which the lens parts may be manufactured economically while producing that degree of excellence which results in an optical system of good and commercially acceptable performance. Such a production run of lens elements is sorted to retain all those which have parameters within said range of values and then selectively assembled from these elements as a complete optical system having compatible or compensating values.

The constructional data for the form of the invention as shown in FIG. 3 wherein the image magnification is 3× are given in Table II herebelow wherein the symbols have the same meaning as heretofore.

TABLE II $2.15F < R_1 < 2.19F$
$2.15F < -R_2 < 2.19F$
$R_3 > \pm 10.0F$
$.62F < R_4 < .64F$
$2.70F < -R_5 < 2.76F$
$.72F < R_6 < .74F$
$1.82F < R_7 < 1.86F$
$.42F < -R_8 < .43F$
$2.29F < R_9 < 2.34F$
$1.57F < R_{10} < 1.60F$
$.107F < t_1 < .119F$
$.107F < t_2 < .119F$
$.163F < t_3 < .176F$
$.136F < t_4 < .148F$
$.127F < t_5 < .139F$
$.136F < t_6 < .148F$
$1.10F < S_1 < 1.32F$
$.005F < S_2 < .017F$
$.236F < S_3 < .248F$
$.709F < S_4 < .737F$
$.792F < S_9 < .884F$ [1]
$5.5F < S_{10} < 6.5F$ [1]
$1.586 < n_D(I) < 1.590$
$1.671 < n_D(IIa) < 1.675$
$1.586 < n_D(IIb) < 1.590$
$1.586 < n_D(III) < 1.590$

[1] At 3× magnification.

TABLE II—Continued $1.515 < n_D(IVa) < 1.519$
$1.717 < n_D(IVb) < 1.723$
$59.0 < \nu(I) < 63.0$
$30.0 < \nu(IIa) < 33.5$
$59.0 < \nu(IIb) < 63.0$
$59.0 < \nu(III) < 63.0$
$62.5 < \nu(IVa) < 66.5$
$40.0 < \nu(IVb) < 44.0$ the $S_9$ and $S_{10}$ values being used only when the recording camera contains a camera lens 24 having a fixed spacing $S_{11}$ forwardly from the negative lens group IV of FIG. 3, the value of $S_{11}$ being substantially .241F and the camera lens 24 having 0.4X positive power.

More specifically the values for the constructional data for the projection lens system 11 are given substantially in the Table III of values herebelow wherein the meaning of the symbols is the same as in Table I.

TABLE III

| | |
|---|---|
| $R_1 = 2.169F$ | $t_1 = .113F$ |
| $-R_2 = 2.169F$ | $t_2 = .113F$ |
| $R_3 = $ Plano | $t_3 = .170F$ |
| $R_4 = .631F$ | $t_4 = .142F$ |
| $-R_5 = 2.731F$ | $t_5 = .133F$ |
| $R_6 = .732F$ | $t_6 = .142F$ |
| $R_7 = 1.838F$ | $S_1 = 1.214F$ |
| $-R_8 = .429F$ | $S_2 = .011F$ |
| $R_9 = 2.314F$ | $S_3 = .242F$ |
| $-R_{10} = 1.586F$ | $S_4 = .723F$ |

$S_5 = .0178F$ at 10× magnification
$S_6 = 10.169F$ at 10× magnification
$S_7 = 0.838F$ at 7.5× magnification
$S_8 = 8.1351F$ at 7.5× magnification

| | |
|---|---|
| $n_D(I) = 1.588$ | $\nu(I) = 61.2$ |
| $n_D(IIa) = 1.673$ | $\nu(IIa) = 32.2$ |
| $n_D(IIb) = 1.588$ | $\nu(IIb) = 61.2$ |
| $n_D(III) = 1.588$ | $\nu(III) = 61.2$ |
| $n_D(IVa) = 1.517$ | $\nu(IVa) = 64.5$ |
| $n_D(IVb) = 1.720$ | $\nu(IVb) = 42.0$ |

For the form of the invention shown in FIG. 3, the values for the constructional data of the projection lens system are more specifically given in Table IV, the meaning of the symbols used being the same as that used in Table III.

TABLE IV

| | |
|---|---|
| $R_1 = 2.169F$ | $t_1 = .113F$ |
| $-R_2 = 2.169F$ | $t_2 = .113F$ |
| $R_3 = $ Plano | $t_3 = .170F$ |
| $R_4 = .631F$ | $t_4 = .142F$ |
| $-R_5 = 2.731F$ | $t_5 = .133F$ |
| $R_6 = .732F$ | $t_6 = .142F$ |
| $R_7 = 1.838F$ | $S_1 = 1.214F$ |
| $-R_8 = .429F$ | $S_2 = .011F$ |
| $R_9 = 2.314F$ | $S_3 = .242F$ |
| $-R_{10} = 1.586F$ | $S_4 = .723F$ |

$S_9 = 0.838F$ at 3.0× magnification
$S_{10} = 5.953F$ at 3.0× magnification

| | |
|---|---|
| $S_{11} = .241F$ | $\nu(I) = 61.2$ |
| $n_D(I) = 1.588$ | $\nu(IIa) = 32.2$ |
| $n_D(IIa) = 1.673$ | $\nu(IIb) = 61.2$ |
| $n_D(IIb) = 1.588$ | $\nu(III) = 61.2$ |
| $n_D(III) = 1.588$ | $\nu(IVa) = 64.5$ |
| $n_D(IVa) = 1.517$ | $\nu(IVb) = 42.0$ |
| $n_D(IVb) = 1.720$ | |

It will be perceived from the foregoing description that the present invention provides a projection lens system for use as a photomicrographic accessory to a microscope which utilizes a minimum of apparatus while accommodating cameras of various sizes in the quickest, simplest and most economical manner. Additionally it will be realized that the described projection lens system provides a well corrected image having substantially a zero Petzval sum and having very low image distortion, all of which fulfills the stated objects of the invention.

Although only certain forms of the present invention have been shown and described in detail, other forms and modifications are possible and changes may be made in the details of arrangement and structure of the device without departing from the spirit of the claims appended hereto.

I claim:

1. A projection lens system characterized by a fixed positive power front lens group which produces a real pupil image whereat a shutter is located and is further characterized by a focusable negative power rear lens group, said front lens group comprising a front double convex lens member designated I having a front surface and a rear surface denoted respectively by $R_1$ and $-R_2$, the minus (—) sign meaning that the center of curvature of such a surface lies on the object side of said surface, the axial thickness thereof being designated $t_1$ and its axial distance from the next previous image plane being represented by $S_1$, a doublet lens member designated II located at an axial distance denoted $S_2$ from member I and being composed of a front plano concave lens element IIa which lies in contact with a rear double convex lens element IIb, the successive lens surface of lens member II being designated $R_3$, $R_4$ and $-R_5$, and the elements IIa, and IIb having axial thicknesses denoted respectively $t_2$ and $t_3$, and a convex-concavo lens member designated III located rearwardly of member II at an axial distance denoted $S_3$ and from the plane of said shutter at an axial distance denoted $S_4$, member III having a front and a rear surface designated respectively $R_6$ and $R_7$, the axial distance therebetween being represented by $t_4$, said rear lens group comprising a negative power doublet lens member which is designated IV and which is focusable to 10× and 7.5× positions corresponding to axial distances $S_5$ and $S_7$ respectively and a back focal distance of $S_6$ and $S_8$ respectively, the lens member IV including a front double concave lens element denoted IVa which lies in contact with a rear double convex lens element denoted IVb, the element IVa having a front surface denoted $-R_8$, and element IVb having a rear surface $-R_{10}$, there being an interface $R_9$ therebetween, the values of the above mentioned parameters $R_1$ to $-R_{10}$, $t_1$ to $t_6$ and $S_1$ to $S_8$ being given mostly in terms of F which is the equivalent focal length of the front positive lens group 17, and $n_D$ and $\nu$ represent the refractive index and Abbe number values respectively of the glass from which the successive elements are formed, $2.15F < R_1 < 2.19F$
$2.15F < -R_2 < 2.19F$
$R_3 > \pm 10.0F$
$.62F < R_4 < .64F$
$2.70F < -R_5 < 2.76F$
$.72F < R_6 < .74F$
$1.82F < R_7 < 1.86F$
$.42F < -R_8 < .43F$
$2.29F < R_9 < 2.34F$
$1.57F < -R_{10} < 1.60F$
$.107F < t_1 < .119F$
$.107F < t_2 < .119F$
$.163F < t_3 < .176F$
$.136F < t_4 < .148F$
$.127F < t_5 < .139F$
$.136F < t_6 < .148F$ $1.586 < n_D(I) < 1.590$
$1.671 < n_D(IIa) < 1.675$
$1.586 < n_D(IIb) < 1.590$
$1.586 < n_D(III) < 1.590$
$1.515 < n_D(IVa) < 1.519$
$1.717 < n_D(IVb) < 1.723$
$59.0 < \nu(I) < 63.0$
$30.0 < \nu(IIa) < 33.5$
$59.0 < \nu(IIb) < 63.0$
$59.0 < \nu(III) < 63.0$
$62.5 < \nu(IVa) < 66.5$
$40.0 < \nu(IVb) < 44.0$
$1.10F < S_1 < 1.32F$
$.005F < S_2 < .017F$
$.236F < S_3 < .248F$
$.709F < S_4 < .737F$
$.672 < S_5 < .764F$ [1]
$9.5F < S_6 < 10.5F$ [1]
$.792F < S_7 < .884F$ [2]
$7.5F < S_8 < 8.5F$ [2]

[1] At 10× magnification.
[2] At 7.5× magnification.

2. A projection lens system characterized by a fixed positive power front lens group which produces a real pupil image whereat a shutter is located and is further characterized by a focusable negative power rear lens group, said front lens group comprising a front double convex lens member designated I having a front surface and a rear surface denoted respectively by $R_1$ and $-R_2$, the minus (—) sign meaning that the center of curvature of such a surface lies on the object side of said surface, the axial thickness thereof being designated $t_1$ and its axial distance from the next previous image plane being represented by $S_1$, a doublet lens member designated II located at an axial distance denoted $S_2$ from member I and being composed of a front plano concave lens element IIa which lies in contact with a rear double convex lens element IIb, the successive lens surfaces of lens member II being designated $R_3$, $R_4$ and $-R_5$, and the elements IIa and IIb having axial thicknesses denoted respectively $t_2$ and $t_3$, and a convex-concavo lens member designated III located rearwardly of member II at an axial distance denoted $S_3$ and from the plane of said shutter at an axial distance denoted $S_4$, member III having a front and a rear surface designated respectively $R_6$ and $R_7$, the axial distance therebetween being represented by $t_4$, said rear lens group comprising a negative power doublet lens member which is designated IV and, in conjunction with a camera lens 24, is focusable to a 3× position corresponding to an axial distance $S_9$ and a back focal distance of $S_{10}$, the lens member IV including a front double concave lens element denoted IVa which lies in contact with a rear double convex lens element denoted IVb, the element IVa having a front surface denoted $-R_8$, and element IVb, having a rear surface $-R_{10}$, there being an interface $R_9$ therebetween, the values of the above mentioned parameters $R_1$ to $-R_{10}$, $t_1$ to $t_6$ and $S_1$ to $S_{10}$ being given mostly in terms of F which represents the equivalent focal length of the front positive lens group 17, and $n_D$ and $\nu$ represent the refractive index and the Abbe number values respectively, $2.15F < R_1 < 2.19F$
$2.15F < -R_2 < 2.19F$
$R_3 > \pm 10.0F$
$.62F < R_4 < .64F$
$2.70F < -R_5 < 2.76F$
$.72F < R_6 < .74F$
$1.82F < R_7 < 1.86F$
$.42F < -R_8 < .43F$
$2.29F < R_9 < 2.34F$
$1.57F < -R_{10} < 1.60F$
$.107F < t_1 < .119F$
$.107F < t_2 < .119F$
$.163F < t_3 < .176F$
$.136F < t_4 < .148F$
$.127F < t_5 < .139F$
$.136F < t_6 < .148F$
$1.10F < S_1 < 1.32F$
$.005F < S_2 < .017F$
$.236F < S_3 < .248F$
$.709F < S_4 < .737F$
$.792F < S_9 < .884F$ [1]
$5.5F < S_{10} < 6.5F$ [1]
$1.586 < n_D(I) < 1.590$
$1.671 < n_D(IIa) < 1.675$
$1.586 < n_D(IIb) < 1.590$
$1.586 < n_D(III) < 1.590$
$1.515 < n_D(IVa) < 1.519$
$1.717 < n_D(IVb) < 1.723$
$59.0 < \nu(I) < 63.0$
$30.0 < \nu(IIa) < 33.5$
$59.0 < \nu(IIb) < 63.0$
$59.0 < \nu(III) < 63.0$
$62.5 < \nu(IVa) < 66.5$
$40.0 < \nu(IVb) < 44.0$

[1] At 3× magnification.

the $S_9$ and $S_{10}$ values being used when the camera lens which is permanently associated with the film plane to receive the magnified image has a 0.40× power and is located at a distance substantially $S_{11} = .241F$ rearwardly from lens member IV.

3. A projection lens system as set forth in claim 1 wherein the values of the constructional data are more specifically given in the table of values herebelow wherein the meaning of the symbols is the same as in claim 1, $R_1 = 2.169F$     $t_1 = .113F$
$-R_2 = 2.169F$     $t_2 = .113F$
$R_3 = $ Plano     $t_3 = .170F$
$R_4 = .631F$     $t_4 = .142F$
$-R_5 = 2.731F$     $t_5 = .133F$
$R_6 = .732F$     $t_6 = .142F$
$R_7 = 1.838F$     $S_1 = 1.214F$
$-R_8 = .429F$     $S_2 = .011F$
$R_9 = 2.314F$     $S_3 = .242F$
$-R_{10} = 1.586F$     $S_4 = .723F$ $S_5 = .718F$ at 10× magnification
$S_6 = 10.169F$ at 10× magnification
$S_7 = .838$ at 7.5× magnification
$S_8 = 8.135F$ at 7.5× magnification $n_D(I) = 1.588$     $\nu(I) = 61.2$
$n_D(IIa) = 1.673$     $\nu(IIa) = 32.2$
$n_D(IIb) = 1.588$     $\nu(IIb) = 61.2$
$n_D(III) = 1.588$     $\nu(III) = 61.2$
$n_D(IVa) = 1.517$     $\nu(IVa) = 64.5$
$n_D(IVb) = 1.720$     $\nu(IVb) = 42.0$ 4. A projection lens system as set forth in claim 2 wherein the values of the constructional data are more specifically given in the table of values herebelow wherein the meaning of the symbols is the same as in claim 2, $R_1 = 2.169F$     $t_1 = .113F$
$-R_2 = 2.169F$     $t_2 = .113F$
$R_3 = $ Plano     $t_3 = .170F$
$R_4 = .631F$     $t_4 = .142F$
$-R_5 = 2.731F$     $t_5 = .133F$
$R_6 = .732F$     $t_6 = .142F$
$R_7 = 1.838F$     $S_1 = 1.214F$
$-R_8 = .429F$     $S_2 = .011F$
$R_9 = 2.314F$     $S_3 = .242F$
$-R_{10} = 1.586F$     $S_4 = .723F$ $S_9 = .838F$ at 3× magnification
$S_{10} = 5.953F$ at 3× magnification $S_{11} = .241F$
$n_D(I) = 1.588$
$n_D(IIa) = 1.673$
$n_D(IIb) = 1.588$
$n_D(III) = 1.588$
$n_D(IVa) = 1.517$
$n_D(IVb) = 1.720$ $\nu(I) = 61.2$
$\nu(IIa) = 32.2$
$\nu(IIb) = 61.2$
$\nu(III) = 61.2$
$\nu(IVa) = 64.5$
$\nu(IVb) = 42.0$

References Cited

UNITED STATES PATENTS

| | | | |
|---|---|---|---|
| 3,353,891 | 11/1967 | Rosenberger | 350—224X |
| 3,437,398 | 4/1969 | Muller et al. | 350—183X |

JOHN K. CORBIN, Primary Examiner

U.S. Cl. X.R.

350—19, 46, 207, 224

UNITED STATES PATENT OFFICE
CERTIFICATE OF CORRECTION

Patent No. 3,561,843   Dated February 9, 1971

Inventor(s) Harold E. Rosenberger

It is certified that error appears in the above-identified patent and that said Letters Patent are hereby corrected as shown below:

Col. 4, line 7 (Table I), change "$S_2$" to -- $S_3$ --;
　　　line 34, change "hold" to -- holding --;
　　　line 58 (Table II), insert a minus sign (-) before "$R_{10}$";
Col. 7, line 61, change "$-R_1$" to -- $-R_{10}$ --

Signed and sealed this 25th day of May 1971.

(SEAL)
Attest:

EDWARD M. FLETCHER, JR.
Attesting Officer

WILLIAM E. SCHUYLER,
Commissioner of Paten